(12) United States Patent
Krishnan et al.

(10) Patent No.: US 10,053,020 B2
(45) Date of Patent: Aug. 21, 2018

(54) STORAGE DEVICE FOR A PICK-UP BOX

(71) Applicant: FORD GLOBAL TECHNOLOGIES, LLC, Dearborn, MI (US)

(72) Inventors: Venkatesh Krishnan, Canton, MI (US); David Adelmard Domingue, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/278,080

(22) Filed: Sep. 28, 2016

(65) Prior Publication Data

US 2018/0086275 A1    Mar. 29, 2018

(51) Int. Cl.
| | | |
|---|---|---|
| *B60R 7/08* | (2006.01) | |
| *B60P 7/08* | (2006.01) | |
| *B62D 33/027* | (2006.01) | |
| *B60J 7/10* | (2006.01) | |

(52) U.S. Cl.
CPC ............. *B60R 7/08* (2013.01); *B60J 7/106* (2013.01); *B60P 7/0815* (2013.01); *B62D 33/0273* (2013.01)

(58) Field of Classification Search
CPC ........................................................ B60R 7/08
USPC ............... 296/24.31, 37.6, 26.09, 3, 100.06; 224/405, 281, 925; 211/94.01, 105.3, 162
See application file for complete search history.

(56) References Cited

U.S. PATENT DOCUMENTS

| | | | | |
|---|---|---|---|---|
| 4,155,465 A | * | 5/1979 | Baublitz | A47B 61/02 |
| | | | | 108/31 |
| 4,239,440 A | * | 12/1980 | James | B60P 1/4435 |
| | | | | 414/540 |
| 4,889,377 A | * | 12/1989 | Hughes | B60P 3/14 |
| | | | | 16/102 |
| 5,050,825 A | | 9/1991 | Bratset | |
| 5,337,905 A | * | 8/1994 | Gast | A47B 61/00 |
| | | | | 211/105.3 |
| 5,427,288 A | | 6/1995 | Trubee | |
| 5,988,722 A | * | 11/1999 | Parri | B60P 1/003 |
| | | | | 224/403 |
| 6,050,763 A | | 4/2000 | Swailes | |
| 6,062,452 A | | 5/2000 | Kauskey | |
| 6,467,663 B1 | * | 10/2002 | Kmita | B60R 9/00 |
| | | | | 224/282 |

(Continued)

*Primary Examiner* — Dennis H Pedder
(74) *Attorney, Agent, or Firm* — Jason Rogers; King & Schickli, PLLC

(57) ABSTRACT

A vehicle having a pick-up box includes a front wall, first and second sidewalls, and a tailgate forming a pick-up box. A first slide member is longitudinally mounted to one of the first and second sidewalls and a second slide member is disposed for telescopic movement between a stowed position and an extended position within the first slide member. The first slide member is mounted such that at least a portion of the second slide member extends outside of the pick-up box in the extended position for ease of access by a vehicle operator standing behind or near the tailgate. At least one hook is attached to or supported by the first slide member for supporting bags of groceries or the like. A handle is attached to an end of the first slide member for moving the slide member between the stowed and the extended positions and a bumper is mounted to the second slide member to limit its movement.

15 Claims, 2 Drawing Sheets

(56) References Cited

U.S. PATENT DOCUMENTS

Figure 1:
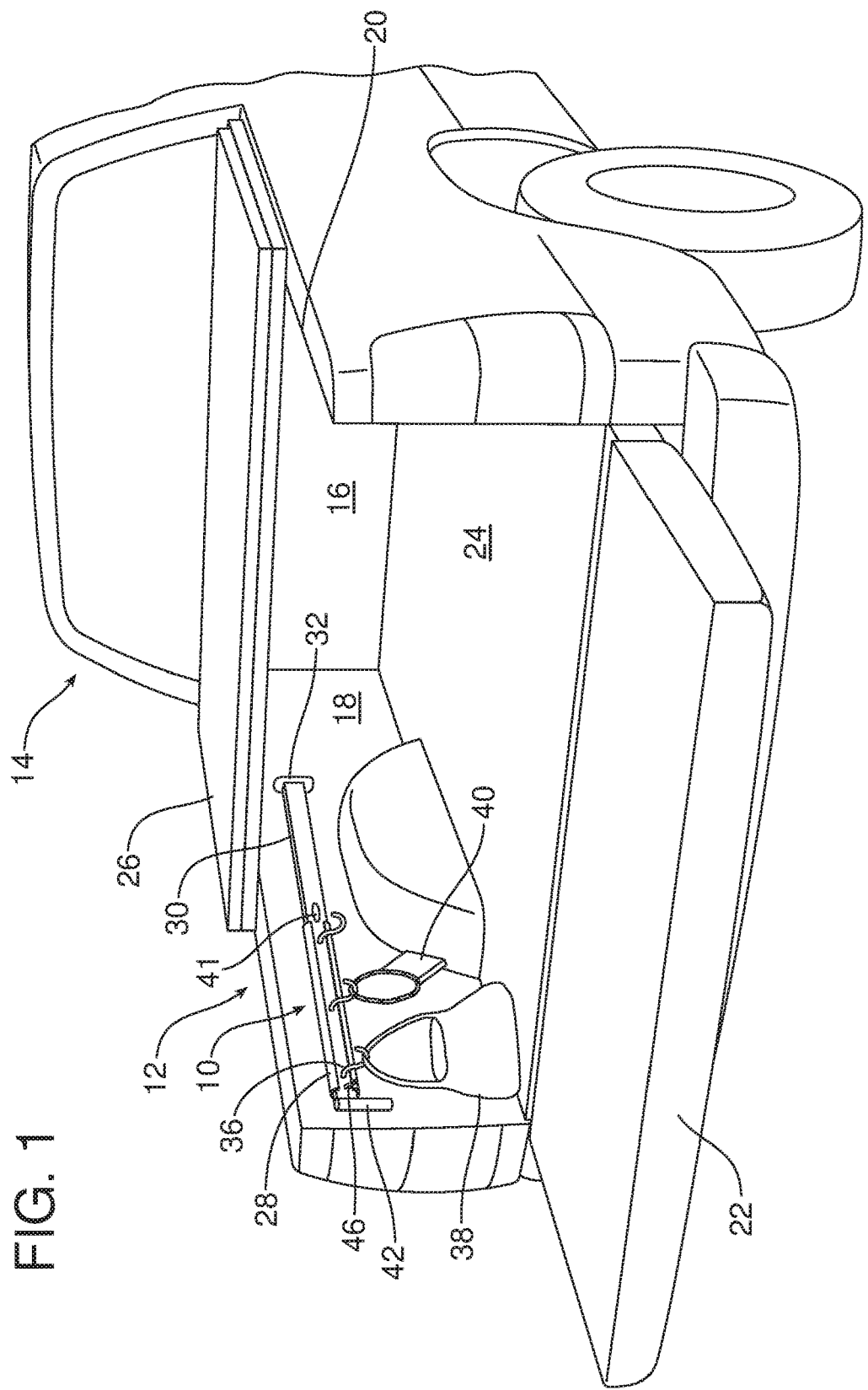

| | | | | |
|---|---|---|---|---|
| 6,491,331 | B1* | 12/2002 | Fox | B62D 33/0273 |
| | | | | 224/403 |
| 6,758,508 | B2* | 7/2004 | Weyhrich | B62D 33/0273 |
| | | | | 296/100.18 |
| 6,883,849 | B2* | 4/2005 | Hebert | B60P 1/003 |
| | | | | 224/403 |
| 7,644,972 | B2 | 1/2010 | Lim | |
| D692,369 | S* | 10/2013 | Mezzanatto | D12/414 |
| 8,864,001 | B2* | 10/2014 | Langseder | B60R 5/041 |
| | | | | 224/405 |
| 9,303,437 | B1 | 4/2016 | Holmes et al. | |
| 2008/0129169 | A1* | 6/2008 | Daino | A47B 88/49 |
| | | | | 312/334.1 |
| 2011/0215608 | A1* | 9/2011 | Jackson | B62D 33/08 |
| | | | | 296/26.11 |
| 2013/0134733 | A1* | 5/2013 | Peters | B60P 1/435 |
| | | | | 296/37.6 |
| 2013/0306694 | A1* | 11/2013 | Langseder | B60R 5/041 |
| | | | | 224/403 |
| 2014/0152046 | A1* | 6/2014 | Facchinello | B60J 7/141 |
| | | | | 296/100.06 |

* cited by examiner

STORAGE DEVICE FOR A PICK-UP BOX

TECHNICAL FIELD

This document relates generally to storage devices, and more specifically to storage devices for a pick-up box of a vehicle.

BACKGROUND

Vehicles with pick-up boxes are commonly used by commercial businesses and individuals alike to haul large bulky items and smaller items depending on need. Large bulky items are typically positioned entirely within the pick-up box or are allowed to extend outside of the pick-up box. Typically, these items extend over a lowered tailgate or rest atop the tailgate. Given their size and bulk, these items are either strapped or tied down or simply do not move around within the pick-up box when the vehicle is moving.

Smaller items, on the other hand, have a tendency to slide all over the pick-up box during movement. This is particularly troublesome when the smaller items include breakables and/or crushables (e.g., eggs, bread, and light bulbs) or end up in a location that is unreachable by the vehicle operator. While such items may be stored in a cab of the vehicle to limit the adverse effects of such movement, there are times when the cab may be filled with other cargo or passengers and other storage arrangements are required.

The utilization of add-on storage units is another possible option. Such storage units, such as tool boxes mounted adjacent the cab, provide little flexibility, however, and are typically too deep to provide easy access to the stored items requiring the vehicle operator to climb into the pick-up box to retrieve the stored items. Some such storage units even suffer from similar issues related to the movement of the items when the vehicle is moving. Even more, these storage units are typically expensive limiting the number of vehicles with this option and/or are heavy such that the storage units are not easily removed in the event it is desirable to utilize the entire pick-up box.

Accordingly, a need is identified for a storage unit or device that is easily installed in and/or removed from the pick-up box of a vehicle. The storage device should be easily accessible by a vehicle operator standing outside of the vehicle and capable of storing and/or securing smaller items including breakables and/or crushables. The storage device should also be presentable to the vehicle user from a stowed position within the pick-up box.

SUMMARY

In accordance with the purposes and benefits described herein, a storage device for storing items in a pick-up box of a vehicle is provided. The storage device may be broadly described as including an outer slide member longitudinally mounted to a sidewall of the pick-up box and an inner slide member operably disposed for telescopic movement between a stowed position and an extended position within the outer slide member. The outer slide member is mounted such that at least a portion of the inner slide member extends outside of the pick-up box.

In another possible embodiment, the storage device may further include at least one hook supported by or attached to the inner slide member. In yet another possible embodiment, the storage device may further include a handle attached to an end of the inner slide member. In still another, a bumper may be mounted to the inner slide member to limit movement of the inner slide.

In one other possible embodiment, the storage device may further include a locking mechanism to prevent movement of the inner slide relative the outer slide. In another, the outer slide member may be channel or C-shaped.

In one additional possible embodiment, the storage device may further include a plurality of bearings in rolling engagement with the inner and outer slide members.

In accordance with an additional aspect, a vehicle having a pick-up box includes a front wall, first and second sidewalls, and a tailgate forming a pick-up box, a first slide member longitudinally mounted to one of the first and second sidewalls, and a second slide member disposed for telescopic movement within the first slide member. The first slide member is mounted such that at least a portion of the second slide member extends outside of the pick-up box.

In another possible embodiment, the vehicle may further include at least one hook attached to the inner slide member. In another, the vehicle may further include a handle attached to an end of the inner slide member. In still another, the vehicle may further include a bumper mounted to the second slide member to limit movement of the second slide member.

In yet another possible embodiment, the vehicle may further include a locking mechanism to prevent movement of the inner slide relative the outer slide. In still yet another, the outer slide member is channel or C-shaped.

In one other possible embodiment, the vehicle may further include a handle attached directly or indirectly to the inner slide member.

In still yet another possible embodiment, the vehicle may further include a cover for the pick-up box. In another, the vehicle may further include a plurality of bearings in rolling engagement with the first and second slide members.

In another aspect of the invention, a vehicle having a pick-up box includes a front wall, first and second sidewalls, and a tailgate forming a pick-up box, a slide mechanism removeably mounted to one of the first and second sidewalls, and a cover for the pick-up box. The slide mechanism may include a moving member supporting a plurality of hooks such that the moving member extends longitudinally so that at least a portion of the moving member extends outside of the pick-up box.

In an additional possible embodiment, the vehicle further includes a handle attached to an end of the inner slide member. In another possible embodiment, the vehicle further includes a bumper to limit movement of the inner slide.

In the following description, there are shown and described several preferred embodiments of the storage device for storing items in a pick-up box of a vehicle. As it should be realized, the storage device is capable of other, different embodiments and their several details are capable of modification in various, obvious aspects all without departing from the embodiments as set forth and described in the following claims. Accordingly, the drawings and descriptions should be regarded as illustrative in nature and not as restrictive.

BRIEF DESCRIPTION OF THE DRAWING FIGURES

Figure 2:
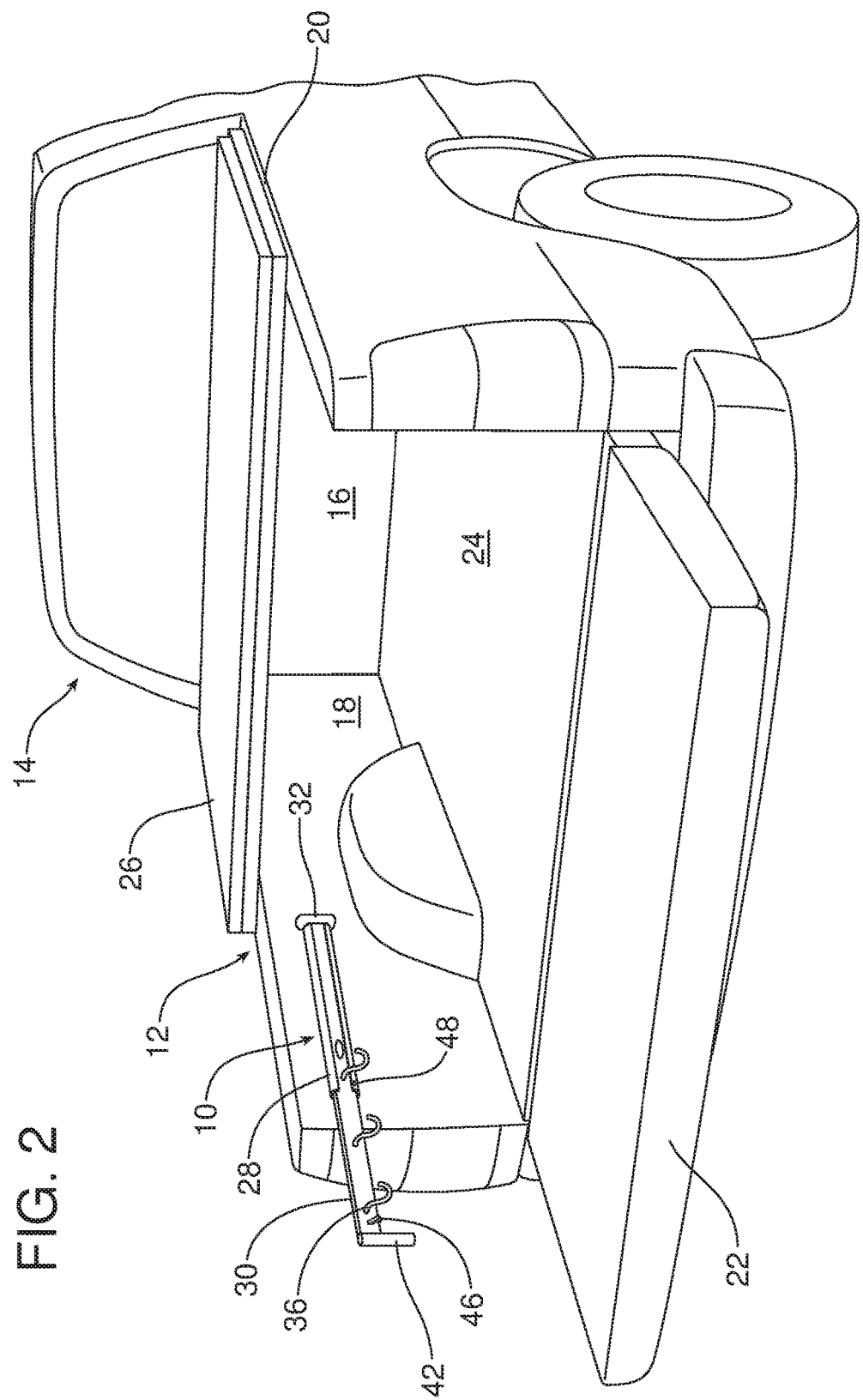

The accompanying drawing figures incorporated herein and forming a part of the specification, illustrate several aspects of a storage device for storing items in a pick-up box of a vehicle and together with the description serve to explain certain principles thereof. In the drawing figures:

FIG. 1 is a perspective view of a pick-up box of a vehicle include a storage device shown in a stowed position; and FIG. 2 is a perspective view of a pick-up box of a vehicle include a storage device shown in an extended position.

Reference will now be made in detail to the present embodiments of the storage device for storing items in a pick-up box of a vehicle, examples of which are illustrated in the accompanying drawing figures, wherein like numerals are used to represent like elements.

DETAILED DESCRIPTION

Reference is now made to FIG. 1 which broadly illustrates an embodiment of a storage device 10 for storing items in a pick-up box 12 of a vehicle 14. The pick-up box 12 includes a front wall 16, a driver side sidewall 18, a passenger side sidewall 20, a tailgate 22 shown in an open position, and a floor 24. The pick-up box 12 may be enclosed by a Tonneau cover (shown in an open position) 26 or be uncovered.

As shown, a rack 28 or outer slide member is longitudinally mounted to the driver side sidewall 18. In an alternate embodiment, the rack 28 may be mounted to the passenger side sidewall 20 or a rack may be mounted to both sidewalls. The rack 28 is generally channel shaped and in the described embodiment is C-shaped. A beam 30, or inner slide member, is operably disposed for telescopic movement within the rack 28. A plurality of bearings in rolling engagement with the beam 30 and the rack 28 accommodate movement of the beam. Together, these components comprise a slide mechanism.

In the described embodiment, the beam 30 moves between a stowed position shown in FIG. 1 and an extended position shown in FIG. 2. A bumper 32 is mounted to a first end 34 of the beam 30 and serves as a stop which limits movement of the beam. A length of the beam 30 is designed such that the bumper 32 contacts the rack 28 in the extended position. In the extended position, the beam 30 is positioned such that at least a portion of the beam extends outside of the pick-up box 12. As shown in FIG. 2, the beam 30 extends over an open tailgate 22 in the described embodiment. Of course, a longer beam 30, in an alternate embodiment, could extend beyond the tailgate 22 or a shorter beam just outside of the pick-up box 12 in order to accommodate access from a rear of the vehicle 14 to the stored items.

As shown, a group of three hooks 36 are attached to the beam 30. The hooks 36 may take any form (e.g., straight pegs), so long as they are sufficient to support items to be stored. As shown in FIG. 1, the hooks may be an equidistance apart for supporting the items such as a shopping bag 38 (e.g., a plastic grocery bag), a tool belt 40, or other items that lend themselves to being supported and preventing their movement within the pick-up box 12 during movement of the vehicle 14. Even more, the beam 30 may include one or more apertures 41 (e.g., a slot or a hole) for receiving a pin, peg, or a similar member for supporting items within the pick-up box 12. Alternatively, the hooks may be removeably mounted or attached to the beam 30 and may be replaced with a different pin or the like. Even more, the hooks may be integrally formed with the beam.

A handle 42 is attached to a second end 44 of the beam 30 to assist in moving the beam between the stowed position and the extended position. The handle 42 may be rigidly attached to the beam 30 or may swivel or pivot upwardly when grasped for ease of use. In an alternate embodiment, the handle 42 may be attached indirectly to, via a chain or the like, or adjacent the second end 44 of the beam 30.

A locking mechanism 46 is used to prevent movement of the beam 30 relative the rack 28. As shown in FIG. 2, the described locking mechanism 46 is a locking tab supported by beam 30 to secure or lock the beam 30 in the stowed position. The rack 28 includes a corresponding aperture 48 or notch for receiving the locking tab 46 and securing the tab in position. In alternate embodiments, the locking mechanism 46 may include, for example, a male portion mounted to the beam 30 and a female portion mounted to the rack 28, or other members sufficient to prevent movement of the beam. The locking mechanism may also be mounted to the sidewall 18 in another embodiment.

In summary, numerous benefits result from providing a storage device for storing items in a pick-up box that is easily installed in and/or removed from the pick-up box of a vehicle. The storage device is easily accessible by a vehicle operator standing outside of the vehicle and capable of storing and/or securing smaller items including breakables and/or crushables. The storage device should also be presentable to the vehicle operator from a stowed position within the pick-up box.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A storage device for storing items in a pick-up box, comprising:
an outer slide member longitudinally mounted to a sidewall of said pick-up box, said outer slide member having first and second ends; and
an inner slide member operably disposed for telescopic movement between a stowed and an extended position along said outer slide member, said inner slide member extending beyond said first and second ends of said slide member;
wherein said outer slide member is positioned such that at least a portion of said inner slide member extends outside of said pick-up box in the extended position.

2. The storage device of claim 1, further comprising at least one hook supported by said inner slide member.

3. The storage device of claim 1, further comprising a handle attached to an end of said inner slide member.

4. The storage device of claim 1, further comprising a bumper mounted to said inner slide member of said pick-up box to limit movement of said inner slide through contact with said first end of said outer slide member.

5. The storage device of claim 4, further comprising a locking mechanism to prevent movement of said inner slide relative said outer slide.

6. The storage device of claim 4, wherein said outer slide member is channel shaped.

7. The storage device of claim 4, further comprising a handle attached to an end of said inner slide member.

8. A vehicle having a pick-up box, comprising:
a front wall, first and second sidewalls, and a tailgate forming the pick-up box;
a first slide member longitudinally mounted to one of said first and second sidewalls, said first slide member having first and second ends; and a second slide member disposed for telescopic movement within said first slide member such that said second slide member extends beyond said first and second ends of said first member;

wherein said first slide member is mounted such that at least a portion of said second slide member extends outside of said pick-up box.

9. The vehicle of claim 8, further comprising at least one hook attached to said second slide member.

10. The vehicle of claim 9, further comprising a handle attached to an end of said second slide member.

11. The vehicle of claim 8, further comprising a bumper mounted to said second slide member of said pick-up box to limit movement of said second slide member through contact with said first end of said first slide member.

12. The vehicle of claim 11, further comprising a locking mechanism to prevent movement of said second slide member relative said first slide member.

13. The vehicle of claim 11, wherein said first slide member is channel shaped.

14. The vehicle of claim 11, further comprising a handle attached to an end of said second slide member.

15. The vehicle of claim 11, further comprising a cover for said pick-up box.

* * * * *